US012212549B2

(12) United States Patent
Lai et al.

(10) Patent No.: US 12,212,549 B2
(45) Date of Patent: Jan. 28, 2025

(54) METHOD AND DEVICE FOR REGISTRATION AND LOGIN, AND COMPUTER-READABLE STORAGE MEDIUM

(71) Applicants: GREE ELECTRIC APPLIANCES, INC. OF ZHUHAI, Zhuhai (CN); LEAYUN TECHNOLOGY CO., LTD. OF ZHUHAI, Zhuhai (CN)

(72) Inventors: Jiajin Lai, Zhuhai (CN); Junwei Huang, Zhuhai (CN); Yuanzhao Wang, Zhuhai (CN); Jiaqi Zhang, Zhuhai (CN)

(73) Assignees: GREE ELECTRIC APPLIANCES, INC. OF ZHUHAI, Zhuhai (CN); LEAYUN TECHNOLOGY CO., LTD. OF ZHUHAI, Zhuhai (CN)

( * ) Notice: Subject to any disclaimer, the term of this patent is extended or adjusted under 35 U.S.C. 154(b) by 276 days.

(21) Appl. No.: 17/717,400

(22) Filed: Apr. 11, 2022

(65) Prior Publication Data

US 2022/0239638 A1 Jul. 28, 2022

Related U.S. Application Data

(63) Continuation of application No. PCT/CN2020/114340, filed on Sep. 10, 2020.

(30) Foreign Application Priority Data

Oct. 24, 2019 (CN) .......................... 201911019809.8

(51) Int. Cl.
*H04L 29/06* (2006.01)
*H04L 9/40* (2022.01)

(52) U.S. Cl.
CPC ................... *H04L 63/08* (2013.01)

(58) Field of Classification Search
CPC ......................... H04L 63/08; H04L 63/0876
See application file for complete search history.

(56) References Cited

U.S. PATENT DOCUMENTS

| 2013/0007723 A1 | 1/2013 | Choudhary et al. |
| 2014/0096205 A1* | 4/2014 | Zhuang ................... H04L 63/10 726/4 |

(Continued)

FOREIGN PATENT DOCUMENTS

| CN | 103118138 A | 5/2013 |
| CN | 103595809 A | 2/2014 |

(Continued)

OTHER PUBLICATIONS

Wazid et al., "Design of Secure User Authenticated Key Management Protocol for Generic IoT Networks", IEEE Internet of Things Journal, vol. 5, Issue: 1, Feb. (Year: 2018).*

(Continued)

*Primary Examiner* — Morshed Mehedi
(74) *Attorney, Agent, or Firm* — Westbridge IP LLC

(57) ABSTRACT

Disclosed are a method, a device and a computer-readable storage medium for registration and login. The method includes: receiving, on a registration device side, registration information used to register a first object; performing a registration operation corresponding to the first object according to the registration information; sending the registration information to a login device that subscribes to the registration information in advance after the registration operation is successful; receiving, on a login device side, the registration information used to successfully register the first object sent by a registration device; receiving login information used to login a second object; and performing a login operation corresponding to the second object if it is determined that the login information has not been used to (Continued)

register the second object and the login information matches the registration information sent by the registration device.

18 Claims, 4 Drawing Sheets

(56) References Cited

U.S. PATENT DOCUMENTS

| | | | |
|---|---|---|---|
| 2015/0293764 A1* | 10/2015 | Visvanathan | G06F 8/36 717/102 |
| 2017/0228381 A1* | 8/2017 | Nazaruk | G06F 21/6227 |
| 2019/0050154 A1* | 2/2019 | Hsu | G06F 3/0659 |
| 2019/0102162 A1* | 4/2019 | Pitre | H04L 63/10 |
| 2020/0145421 A1* | 5/2020 | Tin | H04L 9/0866 |
| 2020/0344133 A1* | 10/2020 | Dawes | G06F 3/0488 |
| 2021/0218725 A1* | 7/2021 | Fang | H04L 9/0894 |
| 2021/0367943 A1* | 11/2021 | Boche | H04L 63/0815 |

FOREIGN PATENT DOCUMENTS

| | | | | |
|---|---|---|---|---|
| CN | 104468457 A | 3/2015 | | |
| CN | 104796389 A | 7/2015 | | |
| CN | 105072133 A | 11/2015 | | |
| CN | 105099985 A | 11/2015 | | |
| CN | 105721623 A | 6/2016 | | |
| CN | 108093395 A | 5/2018 | | |
| CN | 110287691 A | 9/2019 | | |
| WO | WO-2005041131 A2 * | 5/2005 | ......... | G07C 9/00111 |
| WO | WO-2017157177 A1 * | 9/2017 | ........... | G06F 16/957 |

OTHER PUBLICATIONS

First Office Action issued in counterpart Chinese Patent Application No. 201911019809.8, dated Aug. 19, 2021.
International Search Report issued in corresponding PCT Application No. PCT/CN2020/114340, dated Dec. 8, 2020.
Written Opinion issued in corresponding PCT Application No. PCT/CN2020/114340, dated Dec. 8, 2020.

\* cited by examiner

METHOD AND DEVICE FOR REGISTRATION AND LOGIN, AND COMPUTER-READABLE STORAGE MEDIUM

CROSS-REFERENCE TO RELATED APPLICATIONS

This application is a continuation of International Application No. PCT/CN2020/114340 filed on Sep. 10, 2020, which claims priority to Chinese Patent Application No. 201911019809.8 filed on Oct. 24, 2019. The disclosures of the above-mentioned applications are hereby incorporated by reference in their entireties.

TECHNICAL FIELD

This disclosure relates to the field of computer technology, in particular to a method, a device and a computer-readable storage medium for registration and login.

BACKGROUND

With the current rapid development of the Internet, visiting websites has become an indispensable part of daily life of people. Also, with the continuous increasement of user needs, the correlation between various websites is getting closer and closer.

At present, most websites require registration operation before a user can log in. Generally speaking, when the user uses a website for the first time, a user registration operation is required to be performed. After the registration operation is successful, the user is allowed to log in to the website. And if the user wants to use another website, another user registration operation is required. This way of registering separately on different websites not only causes problems of poor user experience and waste of time, but also creates information islands.

For example, there is a certain correlation between e-commerce websites and payment websites, and there is a certain correlation between different social networking websites, but these related websites need to be registered separately before being logged in.

In another example, different websites developed by the same company are registered separately and managed separately rather than sharing information, which makes different websites become information islands.

SUMMARY

The main purpose of this disclosure is to provide a method, a device, and a computer-readable storage medium for registration and login to solve the problem that different websites need to be registered separately in the prior art.

In view of the above technical problems, the following technical solutions are provided in this disclosure.

This disclosure discloses a method for registration and login, performed on a registration device side, comprising: receiving registration information used to register a first object; performing a registration operation corresponding to the first object according to the registration information; and sending the registration information to a login device that subscribes to the registration information in advance after the registration operation is successful, so as for the login device to perform a login operation corresponding to a second object according to the registration information.

Optionally, performing a registration operation corresponding to the first object according to the registration information comprises: submitting the registration information to a preset background program; and making the background program perform the registration operation corresponding to the first object according to the registration information and storing the registration information in a preset message queue after the registration operation is determined to be successful.

Optionally, sending the registration information to the login device that subscribes to the registration information in advance comprises: broadcasting the registration information to the login device that subscribes to the registration information in advance through the message queue.

Optionally, the message queue is a RabbitMQ message queue.

Optionally, the background program is a Spring Boot program.

Optionally, performing a registration operation corresponding to the first object according to the registration information comprises: judging whether the registration information meets a registration condition for registering the first object; determining the registration operation is successful and returning a registration success response to complete the registration operation corresponding to the first object if the registration condition is met; and determining the registration operation fails, returning a registration failure response, and feeding back prompt information corresponding to the registration failure response if the registration condition is not met.

Optionally, sending the registration information to a login device that subscribes to the registration information in advance after the registration operation is successful so as for the login device to perform a login operation corresponding to a second object according to the registration information comprises: sending a token to the login device when jumping from the first object to the second object, wherein the token carries registration information, so as for the login device to perform the login operation corresponding to the second object when determining the registration information carried in the token matches the registration information sent to the login device.

Optionally, the method further comprises: synchronizing the registration information to a third-party interface after the registration operation is successful.

Optionally, the third-party interface corresponds to the login device that subscribes to the registration information in advance.

Optionally, before synchronizing the registration information to a third-party interface after the registration operation is successful, the method further comprises: performing a parameter conversion operation on the registration information if it is determined that a parameter of the third-party interface is different from a parameter of a local end.

This disclosure also discloses a method for registration and login, performed on a login device side, comprising: receiving registration information used to successfully register a first object sent by a registration device; receiving login information used to login a second object; and performing a login operation corresponding to the second object if it is determined that the login information has not been used to register the second object and the login information matches the registration information sent by the registration device.

Optionally, receiving the registration information used to successfully register a first object sent by a registration device comprises: receiving the registration information used to successfully register a first object that is broadcasted by the registration device through a preset message queue.

Optionally, the message queue is a RabbitMQ message queue.

Optionally, receiving login information used to login a second object comprises: receiving a token sent by the registration device when jumping from the first object to the second object, the token carrying registration information.

Optionally, performing a login operation corresponding to the second object if it is determined that the login information has not been used to register the second object and the login information matches the registration information sent by the registration device comprises: performing the login operation corresponding to the second object if the registration information carried in the token matches the registration information used to successfully register the first object sent by the registration device.

Optionally, the login information at least comprises account information.

This disclosure also discloses a device for registration and login comprising a memory having a computer program stored thereon, and a processor configured to execute the computer program to implement steps of any of the above-mentioned methods.

This disclosure also discloses a non-transitory computer storage medium having stored thereon one or more computer programs which, when executed by one or more processors, implement steps of the method of any of the above-mentioned methods.

The beneficial effects of the embodiments of this disclosure include: after the registration device determines that the registration information has been used to successfully register the first object, the registration device sends the registration information to the login device that subscribes to the registration information; after the login device obtains the registration information, if login information that matches the registration information is used when the second object is logged in, even if the login information has not been used to register the second object, the second object can be directly logged in to. This avoids the problem that different objects need to be registered separately and achieves the effect of collective registration for multiple objects.

BRIEF DESCRIPTION OF DRAWINGS

The drawings described here are used to provide a further understanding of this application and constitute a part of this application. The exemplary embodiments of this application and their descriptions are used to explain this application, and do not constitute any improper limitation of this application. In the attached drawings.

DETAILED DESCRIPTION OF THE EMBODIMENTS

In order to make the objectives, technical solutions, and advantages of this disclosure clearer, this disclosure will be further described in detail below with reference to the accompanying drawings and specific embodiments.

An embodiment of this disclosure provides a method for registration and login. This embodiment is performed on a registration device side.

A registration device refers to a device that can perform registration operations. The registration device can be a server corresponding to a network product such as a website, an application, or an official account.

Figure 1:
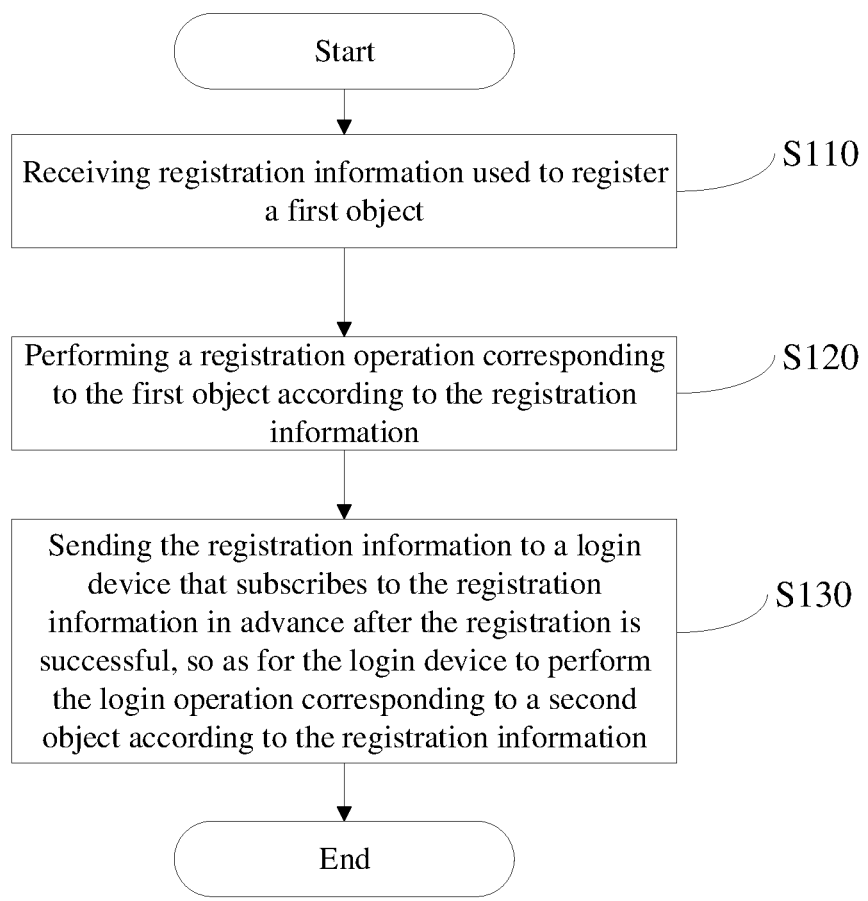
FIG. 1 is a flowchart of a method for registration and login performed on a registration device side according to an embodiment of this disclosure.

FIG. 1 is a flowchart of a method for registration and login performed on a registration device side according to an embodiment of this disclosure. As shown in FIG. 1, the method comprises the following steps.

Step S110: receiving registration information used to register a first object.

The first object is a network product that requires registration, such as a website, an application, an official account, etc.

The registration information includes but not limited to account information, including a username and a password.

Specifically, a user device collects the registration information entered by a user on a registration page corresponding to the first object and sends the registration information to the registration device; the registration device receives the registration information.

Step S120: performing a registration operation corresponding to the first object according to the registration information.

The registration operation includes: judging whether the registration information meets a registration condition for registering the first object; if the registration condition is met, determining the registration operation is successful and returning a registration success response to complete the registration operation corresponding to the first object; if the registration condition is not met, determining the registration operation fails, returning a registration failure response, and feeding back prompt information corresponding to the registration failure response.

Further, the registration condition is, for example, whether a format of the account information is correct. If the registration information does not meet the registration condition, the prompt information corresponding to the registration failure response is sent to the user device, for example, the prompt information indicates that the format of the username is incorrect. The user can modify the registration information or end the registration process after viewing the prompt information through the user device.

Step S130: sending the registration information to a login device that subscribes to the registration information in advance after the registration operation is successful, so as for the login device to perform the login operation corresponding to a second object according to the registration information.

The login device refers to a device that subscribes to the registration information successfully registered on the registration device in advance and can perform the login operation. In an embodiment, the login device and the registration device may be the same device or different devices. In this way, the login device can also be a server corresponding to a network, an application program, or an official account.

For example, the first object and the second object are applications produced by the same company, so that the login device and the registration device can be the same device. In another example, the first object and the second object are related applications, so that the login device and the registration device are different devices, such as an e-commerce website and a payment website.

The second object is the network product that the user wants to log in, for example, a website, an application, an official account, etc. In an embodiment, when the account information is the same, the login of the second object can be realized based on the registration information for the first object.

After the registration operation is successful, the registration information is synchronized to a third-party interface. The third-party interface corresponds to the login device that subscribes to the registration information in advance. If a parameter of the third-party interface that needs to be synchronized is different from a parameter of the local end, a parameter conversion operation for the registration information is performed firstly, and then the registration information after the parameter conversion operation is synchronized to the third-party interface.

In an embodiment, when jumping from the first object to the second object, a token is sent to the login device. Here, the token carries registration information, so that the login device can perform the login operation corresponding to the second object when the registration information carried in the token is determined to match the registration information sent to the login device.

Through this embodiment, after the registration device determines that the registration information has been used to successfully register the first object, the registration device sends the registration information to the login device that subscribes to the registration information; after the login device obtains the registration information, if login information that matches the registration information is used when the second object is logged in, even if the login information has not been used to register the second object, the second object can be directly logged in to. This embodiment avoids the problem that different objects need to be registered separately and achieves the effect of collective registration for multiple objects.

The embodiments of this disclosure also provide a method for registration and login performed on a login device side.

Figure 2:
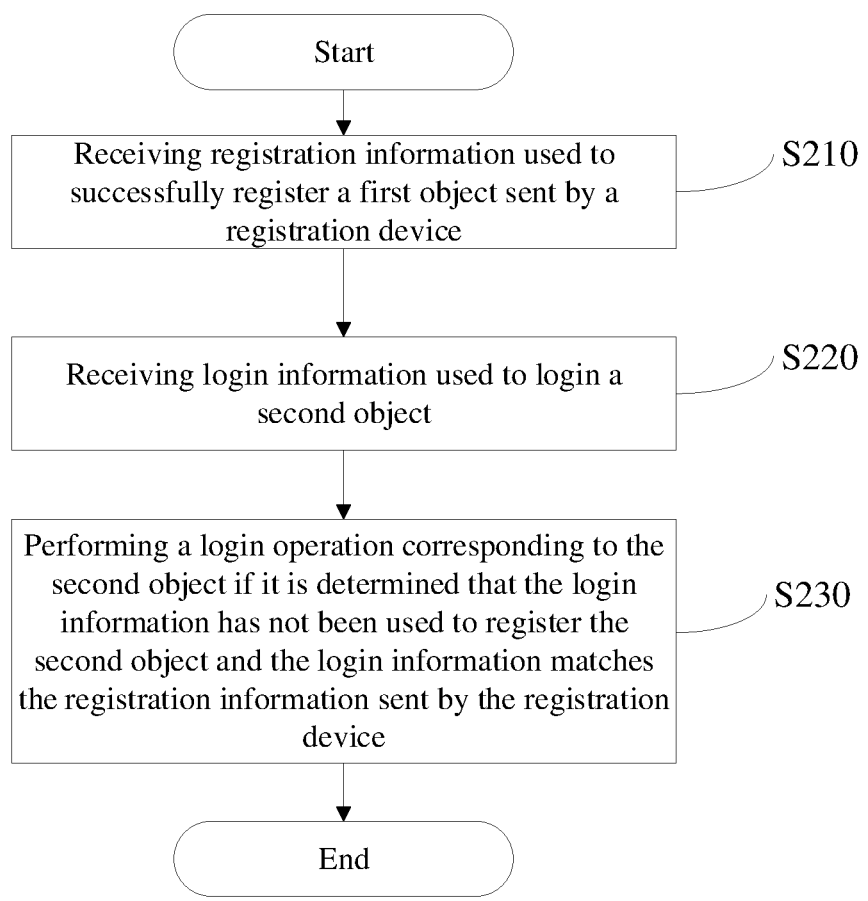
FIG. 2 is a flowchart of a method for registration and login performed on a login device side according to an embodiment of this disclosure.

FIG. 2 is a flowchart of a method for registration and login performed on the login device side according to an embodiment of this disclosure. As shown in FIG. 2, the method comprises the following steps.

Step S210: receiving registration information used to successfully register a first object sent by a registration device.

In an embodiment, the registration information used to successfully register the first object that is broadcasted by the registration device through a preset message queue is received. Further, the message queue is a RabbitMQ message queue.

Step S220: receiving login information used to login a second object.

The login information at least includes account information.

Step S230: performing a login operation corresponding to the second object if it is determined that the login information has not been used to register the second object and the login information matches the registration information sent by the registration device.

The fact that the login information matches the registration information sent by the registration device means that the account information in the login information is the same as the account information in the registration information.

In an embodiment, receiving login information used to login a second object includes: receiving a token sent by the registration device when jumping from the first object to the second object. Here, the token carries registration information. If the registration information carried in the token matches the registration information used to successfully register the first object sent by the registration device, the login operation corresponding to the second object is performed.

In an embodiment, when the user of the first object and the user of the second object are the same, the user is allowed to log in to the second object if the login device determines that the user has registered the first object and not the second object.

The following provides a more specific embodiment to describe a method for registration and login according to an embodiment of this disclosure.

Figure 3:
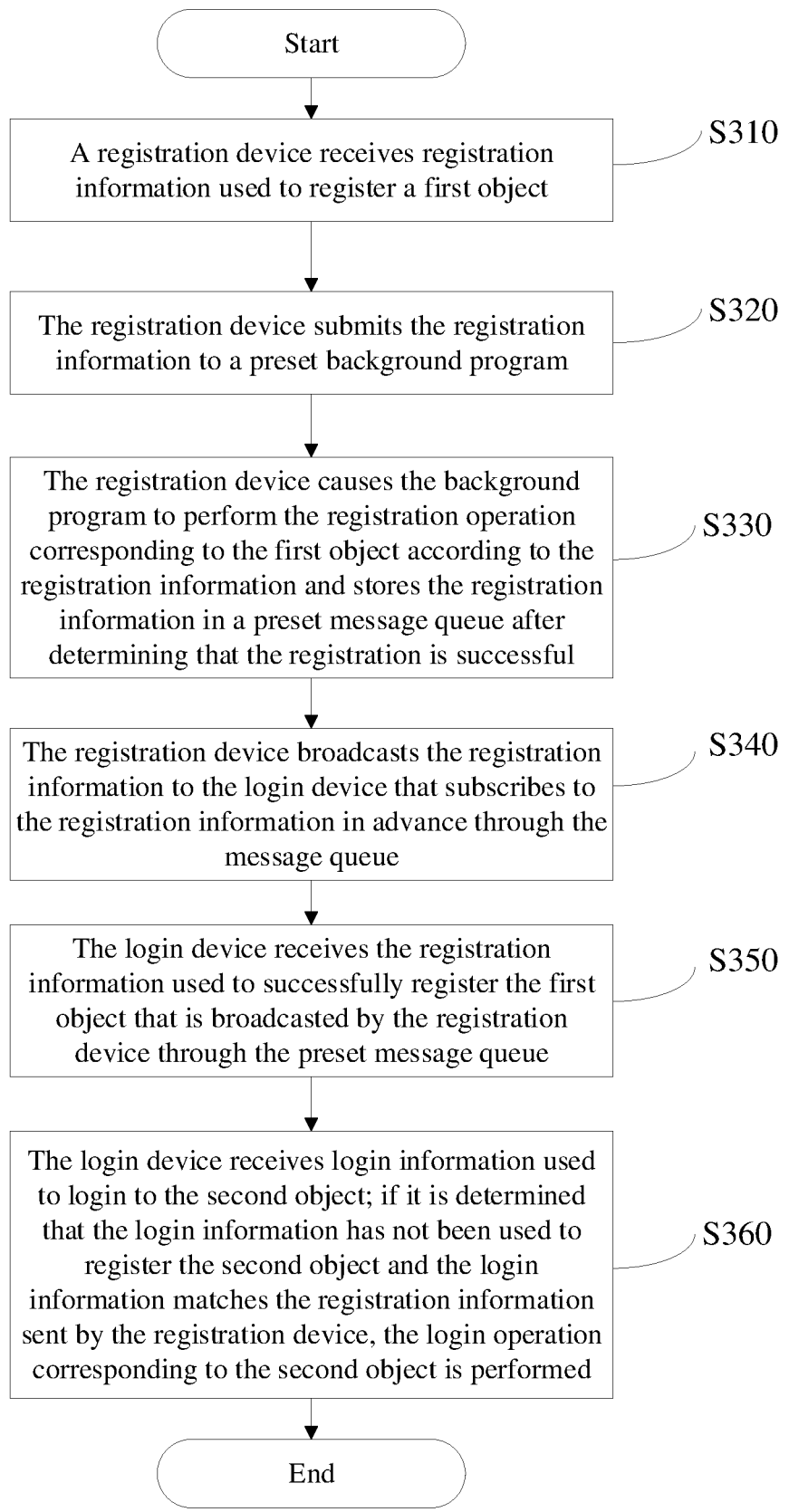
FIG. 3 is a specific flowchart of a method for registration and login according to an embodiment of this disclosure.

FIG. 3 is a specific flowchart of a method for registration and login according to an embodiment of this disclosure. As shown in FIG. 3, the method comprises the following steps.

Step S310: a registration device receives registration information used to register a first object.

The registration device receives a registration request for registering the first object.

The information carried in the registration request includes but is not limited to: a request type, a request address, an Internet Protocol (IP) address, and registration information.

Step S320: the registration device submits the registration information to a preset background program.

The background program may be a Spring Boot program.

The Spring Boot is an ordered collection of open source frameworks, which integrates Spring MVC, Spring JPA and other frameworks.

Step S330: the registration device causes the background program to perform a registration operation corresponding to the first object according to the registration information and stores the registration information in a preset message queue after determining that the registration operation is successful.

The message queue is a RabbitMQ message queue.

The RabbitMQ is a set of open source message queue service software. A subscription and broadcast mechanism of the RabbitMQ can quickly broadcast the information in the RabbitMQ message queue to information subscribers.

Step S340: the registration device broadcasts the registration information to the login device that subscribes to the registration information in advance through the message queue.

Specifically, the user fills in the registration information in a registration interface corresponding to the first object; the registration request carrying the registration information is submitted to a back-end Spring Boot program; the Spring Boot program concatenates various information in the registration request into a string and performs the registration operation according to the string. After the registration operation is performed, if the Spring Boot program determines that the registration operation is successful, at least the registration information in the registration request is stored as a value (variable) in the RabbitMQ message queue; the RabbitMQ message queue broadcasts the stored information so that the login device can receive the broadcasted information.

Further, a storage time limit can be set for the registration information in the RabbitMQ message queue, and the registration information can be deleted after the storage time limit is reached. The length of the storage time limit can be determined according to requirements.

Step S350: the login device receives the registration information used to successfully register the first object that is broadcasted by the registration device through the preset message queue.

The login device stores the registration information used to successfully register the first object. After storing the registration information used to successfully register the first object, it is equivalent to determining that the registration information has been used to complete the registration operation corresponding to the second object.

Step S360: the login device receives login information used to login to the second object; if it is determined that the login information has not been used to register the second object and the login information matches the registration information sent by the registration device, the login operation corresponding to the second object is performed.

After receiving the login information, the login device queries whether the login information has already been used to register the second object. If the second object is already registered, the login operation is directly performed. If the second object is not registered, whether the registration information that matches the login information is stored in the stored registration information is queried. If there is registration information that matches the login information, the login operation is performed. If there is no registration information that matches the login information, then a registration prompt is fed back to prompt the user to register the second object.

In this embodiment, collective registration for multiple network products can be realized using the same registration request, thereby reducing a repetitive operability and the number of times of sending registration requests to the server. Furthermore, through the RabbitMQ publish-subscribe and broadcast mechanism and the Spring Boot program, different network products can be logged in with the same account and password. This embodiment uses the RabbitMQ subscription and broadcast mechanism, which not only accelerates the data access speed, but also effectively reduces the pressure on the back-end data source.

The foregoing embodiments can be applied to the following scenarios. Of course, those skilled in the art should know that the application scenarios of this disclosure are not limited to these.

Scenario 1: a user enters login information in a login page of a network product A; it is detected that the user has not registered the network product A according to the login information, and the login information is queried in a stored registration information, and the login information is determined to match one of the stored registration information, it is determined that the user is already registered and the login operation is started to be performed.

Scenario 2: a user needs to share information from a network product A to a network product B. When jumping from the network product A to the network product B, registration information corresponding to the network product A is carried in a token and sent to the server corresponding to the network product B. When the server finds that the registration information matches stored registration information, it is determined that the user has completed the registration operation, and the user is allowed to log in to the network product B to realize the information sharing from the network product A to the network product B.

Figure 4:
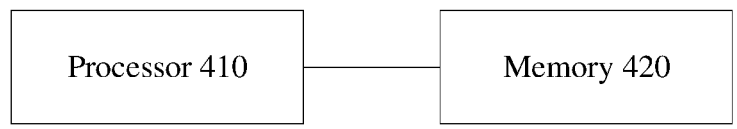
FIG. 4 is a structural diagram of a device for registration and login according to an embodiment of this disclosure.

The embodiments of this disclosure also provide a device for registration and login. FIG. 4 is a structural diagram of a device for registration and login according to an embodiment of this disclosure.

In an embodiment, as shown in FIG. 4, the device for registration and login includes but is not limited to: a processor 410 and a memory 420.

The processor 410 is configured to perform a registration and login program stored in the memory 420 to implement the above-mentioned method for registration and login performed on the registration device side or the method for registration and login performed on the login device side.

Specifically, the processor 410 is configured to perform the registration and login program stored in the memory 420 that is performed on the registration device side to implement the following steps: receiving registration information used to register a first object; performing a registration operation corresponding to the first object according to the registration information; sending the registration information to a login device that subscribes to the registration information in advance after the registration operation is successful, so as for the login device to perform the login operation corresponding to a second object according to the registration information.

Here, performing a registration operation corresponding to the first object according to the registration information includes: submitting the registration information to a preset background program; making the background program perform the registration operation corresponding to the first object according to the registration information and storing the registration information in a preset message queue after the registration operation is determined to be successful. Sending the registration information to the login device that subscribes to the registration information in advance includes: broadcasting the registration information to the login device that subscribes to the registration information in advance through the message queue.

Here, the background program is a Spring Boot program; the message queue is a RabbitMQ message queue.

Here, sending the registration information to the login device that subscribes to the registration information in advance includes: sending a token to the login device when jumping from the first object to the second object. Here the token carries registration information, so that the login device can perform the login operation corresponding to the second object when the registration information carried in the token is determined to match the registration information sent to the login device.

The processor 410 is configured to perform the registration and login program stored in the memory 420 that is performed on the login device side, so as to implement the following steps: receiving registration information used to successfully register a first object sent by a registration device; receiving login information used to login a second object; performing a login operation corresponding to the second object if it is determined that the login information has not been used to register the second object and the login information matches the registration information sent by the registration device.

Here, receiving the registration information used to successfully register a first object sent by a registration device includes: receiving the registration information used to successfully register a first object that is broadcasted by the registration device through a preset message queue.

Here, the message queue is a RabbitMQ message queue.

Here, receiving the registration information used to successfully register a first object sent by a registration device includes: receiving a token sent by the registration device when jumping from the first object to the second object. Here, the token carries registration information. If the registration information carried in the token matches the registration information used to successfully register the first object sent by the registration device, the login operation corresponding to the second object is performed.

The embodiments of this disclosure also provide a computer-readable storage medium. The computer-readable storage medium stores one or more programs. The computer-readable storage medium may include volatile memory, such as random access memory; the memory may also include non-volatile memory, such as read-only memory, flash memory, hard disk, or solid-state hard disk; and the memory may also include a combination of the above types of memories.

One or more programs in the computer-readable storage medium may be performed by one or more processors to implement the above-mentioned method for registration and login performed on the registration device side or implement the above-mentioned method for registration and login performed on the login device side.

Specifically, the processor is configured to perform the registration and login program stored in the memory and performed on the registration device side to implement the following steps: receiving registration information used to register a first object; performing a registration operation corresponding to the first object according to the registration information; sending the registration information to a login device that subscribes to the registration information in advance after the registration operation is successful, so as for the login device to perform the login operation corresponding to a second object according to the registration information.

Here, performing a registration operation corresponding to the first object according to the registration information includes: submitting the registration information to a preset background program; making the background program perform the registration operation corresponding to the first object according to the registration information and storing the registration information in a preset message queue after the registration operation is determined to be successful. Sending the registration information to the login device that subscribes to the registration information in advance includes: broadcasting the registration information to the login device that subscribes to the registration information in advance through the message queue.

Here, the background program is a Spring Boot program; the message queue is a RabbitMQ message queue.

Here, sending the registration information to the login device that subscribes to the registration information in advance includes: sending a token to the login device when jumping from the first object to the second object. Here the token carries registration information, so that the login device can perform the login operation corresponding to the second object when determining the registration information carried in the token matches the registration information sent to the login device.

The processor is configured to perform a registration and login program stored in the memory and performed on the login device side to implement the following steps: receiving registration information used to successfully register a first object sent by a registration device; receiving login information used to login a second object; performing a login operation corresponding to the second object if it is determined that the login information has not been used to register the second object and the login information matches the registration information sent by the registration device.

Here, receiving the registration information used to successfully register a first object sent by a registration device includes: receiving the registration information used to successfully register a first object that is broadcasted by the registration device through a preset message queue.

Here, the message queue is a RabbitMQ message queue.

Here, receiving the registration information used to successfully register a first object sent by a registration device includes: receiving a token sent by the registration device when jumping from the first object to the second object. Here, the token carries registration information. If the registration information carried in the token matches the registration information used to successfully register the first object sent by the registration device, the login operation corresponding to the second object is performed.

The above are only the embodiments of this disclosure and are not used to limit this disclosure. For those skilled in the art, this disclosure may have various modifications and changes. Any modification, equivalent replacement, improvement, etc. that is made within the spirit and principle of this disclosure shall be included in the scope of the claims of this disclosure.

What is claimed is:

1. A method for registration and login, performed on a registration device side, comprising:
   receiving registration information, used to register on a first object, of a user;
   performing a registration operation of the user corresponding to the first object according to the registration information of the user; and
   sending the registration information of the user to a login device that subscribes to the registration information of the user in advance after the registration operation of the user on the first object is successful, so as for the login device to perform a login operation of the user corresponding to a second object according to the registration information of the user,
   wherein after the sending the registration information of the user to a login device that subscribes to the registration information of the user in advance after the registration operation of the user on the first object is successful, the method further comprises:
   sending a token of the user to the login device when jumping from the first object to the second object, wherein the token carries registration information of the user, so as for the login device to perform the login operation of the user corresponding to the second object when determining that the registration information of the user carried in the token of the user matches the registration information of the user sent to the login device.

2. The method according to claim 1, wherein performing a registration operation of the user corresponding to the first object according to the registration information of the user comprises:
   submitting the registration information of the user to a preset background program; and
   making the background program perform the registration operation of the user corresponding to the first object according to the registration information of the user and storing the registration information of the user in a preset message queue after the registration operation of the user is determined to be successful.

3. The method according to claim 2, wherein sending the registration information of the user to a login device that subscribes to the registration information of the user in advance comprises:

broadcasting the registration information of the user to the login device that subscribes to the registration information of the user in advance through the message queue.

4. The method according to claim 3, wherein the message queue is a RabbitMQ message queue.

5. The method according to claim 2, wherein the background program is a Spring Boot program.

6. The method according to claim 1, wherein performing a registration operation of the user corresponding to the first object according to the registration information of the user comprises:
  judging whether the registration information of the user meets a registration condition for registering on the first object;
  determining the registration operation of the user is successful and returning a registration success response to complete the registration operation of the user corresponding to the first object if the registration condition is met; and
  determining the registration operation of the user fails, returning a registration failure response, and feeding back prompt information corresponding to the registration failure response if the registration condition is not met.

7. The method according to claim 1, further comprising:
  synchronizing the registration information of the user to a third-party interface after the registration operation of the user is successful.

8. The method according to claim 7, wherein before synchronizing the registration information of the user to a third-party interface after the registration operation of the user is successful, the method further comprises:
  performing a parameter conversion operation on the registration information of the user if it is determined that a parameter of the third-party interface is different from a parameter of a local end.

9. The method according to claim 7, wherein the third-party interface corresponds to the login device that subscribes to the registration information of the user in advance.

10. A method for registration and login, performed on a login device side, comprising:
  receiving registration information of a user used to successfully register on a first object sent by a registration device;
  receiving login information of a user used to login on a second object; and
  performing a login operation of the user corresponding to the second object if it is determined that the login information of the user has not been used to register on the second object and the login information of the user matches the registration information of the user sent by the registration device,
  wherein the receiving login information of a user used to login a second object comprises:
  receiving a token sent by the registration device when jumping from the first object to the second object, the token carrying registration information of the user,
  wherein the performing a login operation of the user corresponding to the second object if it is determined that the login information of the user has not been used to register on the second object and the login information of the user matches the registration information of the user sent by the registration device comprises:
  performing the login operation of the user corresponding to the second object if the registration information of the user carried in the token matches the registration information of the user used to successfully register on the first object sent by the registration device.

11. The method according to claim 10, wherein receiving registration information of the user used to successfully register on a first object sent by a registration device comprises:
  receiving the registration information of the user used to successfully register on the first object that is broadcasted by the registration device through a preset message queue.

12. The method according to claim 11, wherein the message queue is a RabbitMQ message queue.

13. The method according to claim 10, wherein the login information of the user at least comprises account information.

14. A device for registration and login, comprising a memory having a computer program stored thereon, and a processor configured to execute the computer program to implement steps of the method according to claim 1.

15. A device for registration and login comprising a memory having a computer program stored thereon, and a processor configured to execute the computer program to implement steps of the method according to claim 10.

16. A non-transitory computer storage medium having stored thereon one or more computer programs which, when executed by one or more processors, implement steps of the method according to claim 1.

17. A non-transitory computer storage medium having stored thereon one or more computer programs which, when executed by one or more processors, implement steps of the method according to claim 10.

18. The method according to claim 1, wherein the user has not registered the second object, and the login device is configured to perform the login operation of the user corresponding to the second object when determining that the registration information of the user carried in the token of the user matches the registration information of the user sent to the login device.

* * * * *